Figure 1:
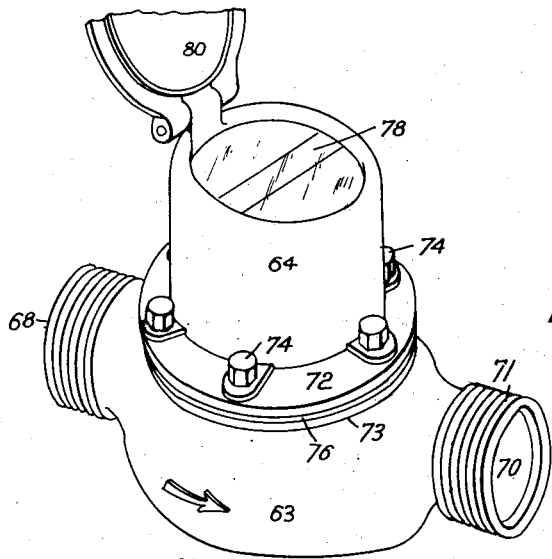

Aug. 28, 1951 A. B. LINDLEY ET AL 2,566,220
WATER METER

Filed June 29, 1949 4 Sheets-Sheet 1

Inventors
A. B. Lindley
A. V. Hemmens
By [signature]
Attys.

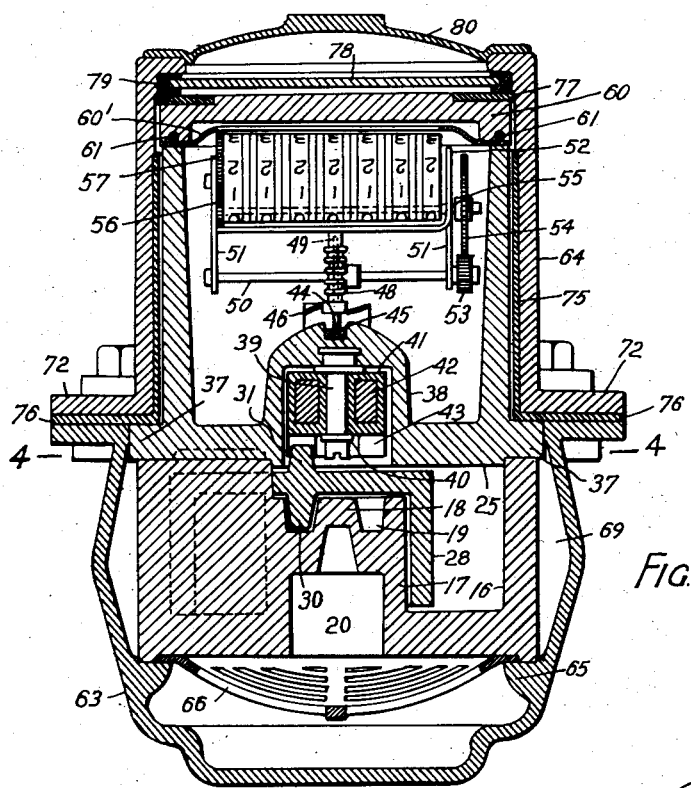
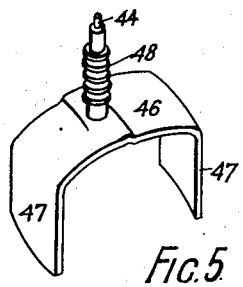
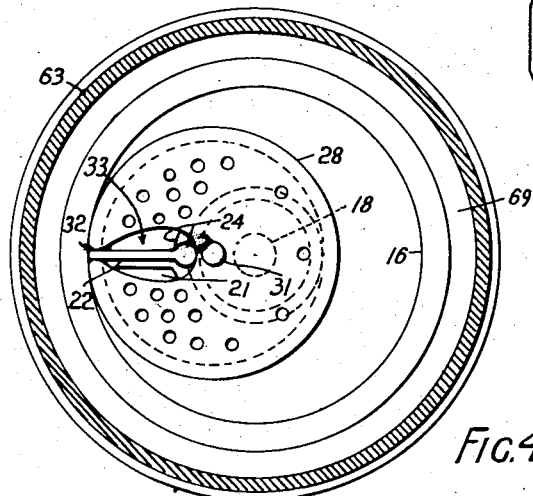

Aug. 28, 1951 A. B. LINDLEY ET AL 2,566,220
WATER METER

Filed June 29, 1949 4 Sheets-Sheet 3

Inventors
A. B. Lindley
A. V. Hemmens
By Mason Kolesnik Rothfeld Attys

Inventors
A. B. Lindley
A. V. Hemmens

Patented Aug. 28, 1951

2,566,220

UNITED STATES PATENT OFFICE 2,566,220

WATER METER

Alan Bray Lindley, Mosman, near Sydney, New South Wales, and Alfred Victor Hemmens, Elizabeth Bay, near Sydney, New South Wales, Australia, assignors to Electricity Meter Manufacturing Company Pty. Limited, Waterloo, near Sydney, New South Wales, Australia, a company of New South Wales Application June 29, 1949, Serial No. 102,042
In Australia July 19, 1948

2 Claims. (Cl. 73—257)

This invention relates to semi-positive rotary type water meters having a magnetic drive between the piston and the recording gear.

The object of the invention is to provide a water meter having a magnetic coupling for the piston and registering mechanism comprising a magnet and armature characterised in that the magnetic attraction is radial and balanced and further characterised in that the armature which is connected by a train of gears to the recording unit, incorporates an aerofoil structure to create a reaction whereby the weight of the armature is balanced.

The water meter of this invention consists of a cylindrical measuring chamber with an axial boss constituting a piston guide; there is a radial division plate between the boss and the wall of the chamber. There is also an inlet in the bottom and an outlet in the cylindrical wall. An inverted U section piston in the measuring chamber has the inlet and outlet at the bottom and pressure balancing ports in the top and on each side of the vertical slot in the piston wall. The measuring chamber cover—called herein a "top plate" —has a pressure transfer port therein; it also has an axial recess housing a driving magnet and said driving magnet has means in driving engagement with the piston. The top plate is the bottom of a register case which is sealed against the entry of water and which houses the magnet armature, a simple train of gears and a "cyclometer" recording or "circular reading" recording unit.

A meter casing to house the measuring chamber and the register case consists of a base part and a cover part. The base part has a seating therein for the measuring chamber. It also houses a screen which covers the bottom of the measuring chamber. There is an inlet to the meter casing below the measuring chamber. The wall of the base part of the meter casing is constructed to provide an annular cavity around the wall of the measuring chamber and there is an outlet from said cavity. The cover part houses the register case and where a "dry" meter is required it is constructed to seal the top of the annular cavity.

Although it is necessary to make the combination of parts outlined above in order to obtain the full benefit of this invention as will be given in full detail later certain benefits will be obtained and the invention is not avoided by providing a measuring chamber having other means than those described herein actuated by a flow of water through the meter to in turn actuate a driving magnet mounted in an axial recess in the bottom of a sealed register case, which register case has the magnet armature rotatably mounted in juxtaposition to the driving magnet with a driving gear train connection to a recording unit.

Figure 2:
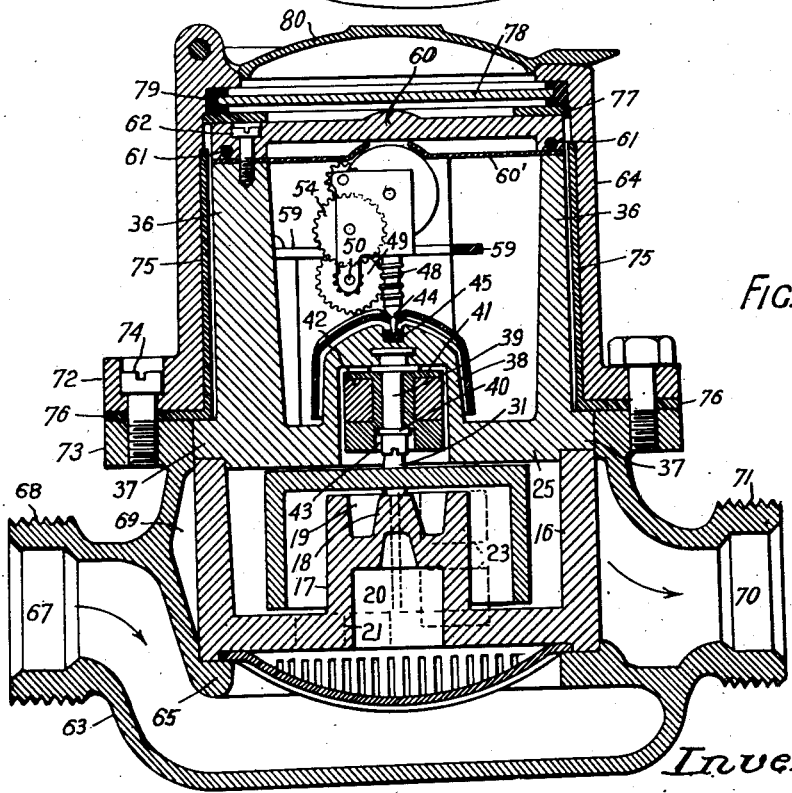
Figure 6:
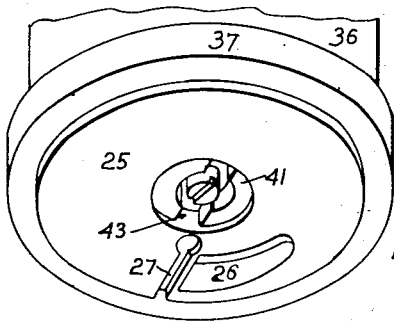
Figure 8:
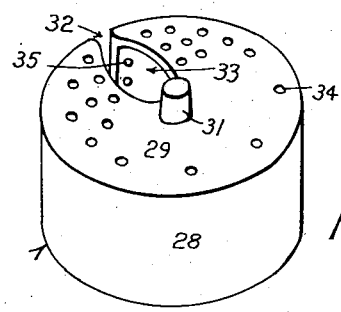
Figure 7:
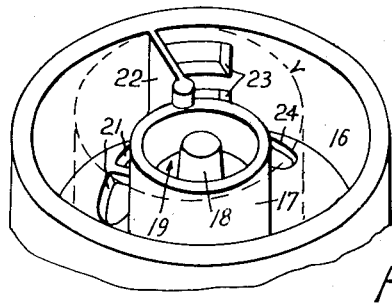
Figure 9:
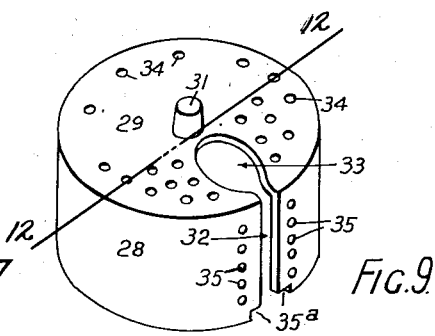
Figure 10:
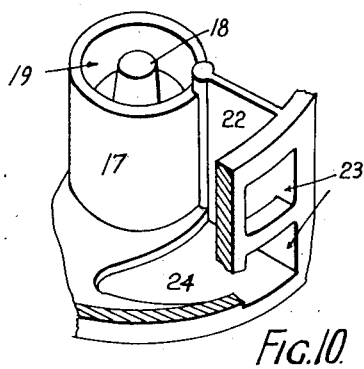
Figure 11:
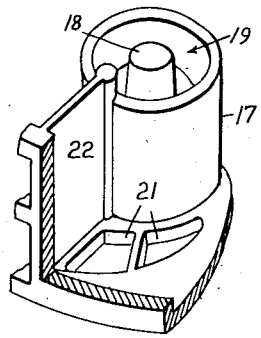
Figure 12:
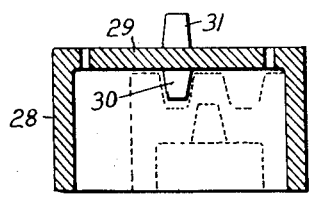
Figure 13:
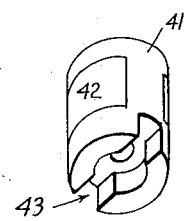
Figure 14:
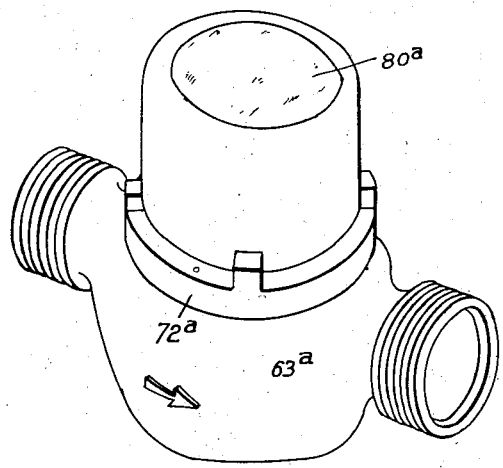
Figure 15:
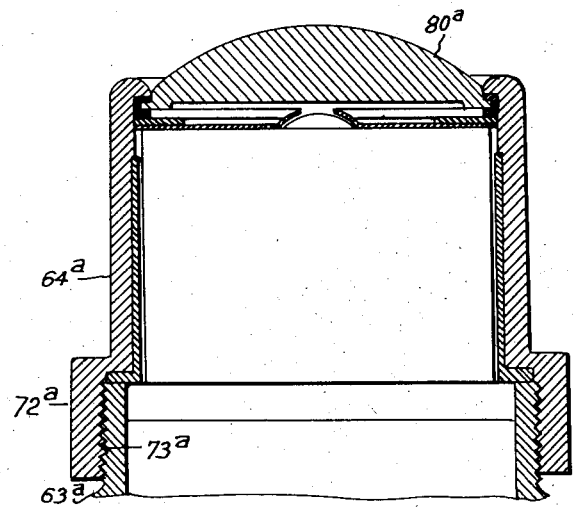

The invention is illustrated in the annexed drawings wherein Fig. 1 is a perspective view of the water meter with the lid raised; Figs. 2 and 3 are central sectional elevations at right angles to one another; Fig. 4 is a sectional plan on line 4—4 of Fig. 3; Fig. 5 is a perspective view of the armature; Fig. 6 is a fragmentary perspective view of the outer bottom end (top plate) of the register case; Fig. 7 is a fragmentary perspective view in the top of the measuring chamber; Figs. 8 and 9 are perspective views of two different positions of the piston; Figs. 10 and 11 are fragmentary sectional perspective views illustrating the port openings in the measuring chamber; Fig. 12 is a sectional elevation on plane 12—12 of Fig. 9; Fig. 13 is a perspective view of the driving magnet assembly; Fig. 14 is a perspective view showing another form of meter casing; Fig. 15 is a fragmentary sectional elevation of the casing of Fig. 14.

This water meter has a cylindrical open top measuring chamber 16 having a boss 17 projecting upwardly from the bottom with a pedestal 18 in the top thereof formed by making an annular recess 19 in said top. The top terminates below the cylindrical wall of the measuring chamber 16 to enable the top plate to seat in the top of the measuring chamber. The annular recess 19 is the track in which the driven pin of the piston rides. The boss 17 is hollow as indicated at 20 in order to make the entire wall thickness of the complete unit substantially uniform. It is conveniently made of plastic. There is an inlet port 21 in the bottom and a radial division plate 22 extending from the wall of the chamber to the boss 17. It can be made an integral member in a moulding operation. There is an outlet port 23 in the wall of the chamber positioned in the same relationship to the inlet port as the outlet port of the previous constructions incorporated in the bottom of the measuring chamber. This port is bridged transversely for strength as shown in Fig. 10. A transfer port 24 is recessed in the bottom of the chamber and the top plate 25 has a complementary transfer port 26 in the bottom thereof adjacent a guide recess 27 for the radial division plate 22. This guide recess fixes the position of the top plate.

Hitherto in water meters of this type the piston has been constructed as an H section member and usually the measuring chamber has had the inlet port at the bottom and the water outlet port at the top although in one type dual inlet ports provided at the top and bottom and outlet ports were provided through the top and side. In all cases provision had to be made for water to flow through the piston diaphragm to the outlet port. This construction necessarily caused a comparatively large head loss for a given velocity of water.

The head loss referred to above is avoided herein by the provision of a U section piston consisting of a cylinder 28 having a top cap 29 incorporating the driving pins 30—31. The wall of the cylinder has a through slot 32 therein to enable it to fit over the division baffle 22 and the top cap has an arcuate slot 33 therein to enable the piston to oscillate about the division plate 22. In addition the top and the wall have pressure equalising ports 34—35 therein.

Inverted U section type pistons have been used hitherto in oil and petrol pumps wherein the inlet and outlet ports have been incorporated in the bottom of the measuring chamber. Difficulties to be overcome in adapting this type of piston to a water meter have been (a) to arrange the ports so that a water seal can be made between them; (b) to make a water-tight joint between the inlet and outlet of the measuring chamber; and (c) to provide a sediment screen of sufficient capacity in the area available.

By overcoming these difficulties it is found that the U section piston has a number of manufacturing advantages over the H section piston. For example the H section piston has six main measurements which must accurately be adhered to whereas the U section piston has only four such measurements. Then the measuring chamber for the H section piston has thirteen measurements to be accurately adhered to whereas the measuring chamber for the U section piston has only eight such measurements.

The measurements referred to in the preceding paragraph are as follows: The U section piston main measurements (1) outside diameter; (2) inside diameter; (3) outside height; (4) inside height: The H section piston main measurements (1) outside diameter; (2) inside diameter on the top half of H section; (3) inside bottom half of H section; (4) total height; (5) depth of top half of H section; (6) depth of bottom half of H section. The measuring chamber for the U section piston: (1) inside diameter of chamber; (2) depth of chamber; (3) diameter of boss; (4) height of boss; (5) thickness of radial division plate; (6) width of annular recess for piston driving pin; (7) depth of annular recess; (8) depth of flange on top plate. The measuring chamber for the H section piston: (1) inside diameter of chamber; (2) width of radial division plate; (3) height of radial division plate; (4) depth of measuring chamber; (5) diameter of bottom boss; (6) height of boss; (7) depth of flange on top plate; (8) diameter of hub on top plate; (9) height of hub on top plate; (10) diameter of peg for piston roller; (11) height of peg; (12) hole diameter for piston drive roller; (13) outside diameter of piston roller.

Water hammer in the measuring chamber, such as may be caused by the difference in the volumetric capacity of the areas inside and outside the piston is avoided by the provision of the transfer port 26 in the top plate and by the ports 34 formed in the top cap of the piston. These ports permit the passage of water to equalise the pressure inside and outside the piston and thus balance the piston against upward thrust of water entering the bottom of the measuring chamber. The H section piston also has a number of holes in its diaphragm but such holes have to constitute passage-ways for the water, which in such pistons must flow from one side of the piston to the other. No such flow of water develops with the U section piston of this invention beyond that required to maintain the piston in a state of balance. Piston balance is assisted by the ports 35. The bottom ports of this series are made as slots as illustrated at 35a; by calibrating their size the displacement each revolution can be accurately measured.

The piston and the measuring chamber are so designed that the inlet port is not closed completely until the outlet port is partially opened. This provides a semi-positive water meter having in said parts the advantage of low production costs; a low head loss, and an almost complete absence of water hammer resulting in quiet operation and little risk of breakage from water hammer.

The top plate 25 of the measuring chamber having the port 26 therein is the bottom of the register case 36. There is a flange 37 just above the bottom adapted to seat on the top of the wall of the measuring chamber and against the wall of the meter casing. This flange—in dry meter—seals the measuring chamber from the other parts of the meter. In a wet meter there is a passage through or around this flange. The register case is conveniently made of plastic.

There is a cylindrical boss 38 projecting upwardly and positioned axially in the top plate 25; it is open at the bottom and constitutes a housing for the driving magnet while the outer wall constitutes a support and guide for the magnet armature.

A journal pin 39 anchored in the top of the cylindrical boss 38 and projecting downwardly axially therein has a bearing head 40 on the bottom. A plastic hub 41 rotatably mounted on the journal pin has a driving permanent magnet 42 mounted in the body thereof. This magnet may be of U shape or it may be made as illustrated as units embedded in cavities in the wall of the hub. There is a driving recess 43 in the bottom of the hub to take the piston drive pin 31.

In the register case a spindle 44 rotatably mounted on a point bearing 45 in the top of the cylindrical boss 38 has an inverted U shaped magnet armature affixed thereto. This armature is made of plate and has the top 46 shaped as an aerofoil to create a lift when the armature is rotated. The legs 47 are shaped to rotate about cylindrical boss 38.

The spindle 44 has a drive worm 48 thereon engaging a worm wheel 49 on a spindle 50 supported in bearing brackets 51 suspended from the cyclometer counter frame 52. A pinion 53 also on the spindle 50 is in engagement with a spur wheel 54 on spindle 55 in bearings in the cyclometer counter frame. This spindle 55 has a pinion 56 engaging spur wheel 57 which is attached to the end driving wheel of the cyclometer recording gear 58 which can consist of six or more number wheels as required and which incorporates a zeroising movement. The cyclometer counter frame 52 is secured by screws to lugs 59 projecting from the wall of the register case 36. It will be seen that the construction provides a registering gear having only one worm and one worm wheel, two pinions, two spur wheels, a set of wheels and roller pinions. In a cyclometer registering assembly of six number wheels and five roller pinions the total gear components for the entire drive is seventeen whereas in previous water meters incorporating an under gear and a similar recording assembly there are usually thirty gear components. It will be appreciated that a "circular reading" registering assembly may be substituted for the cyclometer type illustrated.

The dial cover plate 60 may be made of transparent plastic having windows formed in juxtaposition to the counter units by blacking out or masking the other parts or a windowed dial plate 60' may be set below it. The dial cover plate is seated on the top of the cylindrical wall of the register case 36 with a sealing packing 61 interposed and it is retained in position by screws 62, thus making the register case a sealed unit. As the drive and counter gear enclosed in the register case are protected from grit and other fouling matter the gears can be made of lighter construction than was possible hitherto. This improves the operation of the meter without diminishing the life of the parts.

The meter casing to house the measuring chamber and the register case consists of a base part 63 and a cover part 64. The base part 63 has a seating 65 for the bottom edge of the measuring chamber 16. A screen 66 is incorporated in the meter casing below the measuring chamber. It covers the whole of the bottom of the measuring chamber and thus has sufficient area to reduce flow loss through the screen to the minimum. The edge of the screen seats between the bottom edge of the measuring chamber and the seating 65. There is an inlet 67 to the meter casing below the measuring chamber; it has a screwed part 68 to take a pipe coupling. The wall of the base part 63 is constructed to provide an annular cavity 69 around the wall of the measuring chamber 16 and there is an outlet 70 from said cavity; it has a screwed part 71 to take a pipe coupling. A screen (not shown) may be fitted in the annular cavity to prevent dirt entering the meter in the event that the water flow reverses.

The cover part 64 of the meter casing has a flange 72 adapted to seat on flange 73 of the base part and on top of flange 37 of the register case 36 thus holding the several parts in designed position. This cover part is held in place by set screws 74.

An annular ferrous member 75 is fitted between the register case 36 and the cover part 64 of the meter casing. It can be a loose fit, or where a plastic cover part is employed it may be embedded therein as a reinforcement and have a flange 76 as part of the reinforcement. This member 75 protects the magnetic drive from outside electrical or magnetic interference. Alternatively the cover part may be made of ferrous metal for the same purpose.

There is an annular plate or flange 77 in the top of the cover part 64; it covers the screws 62 holding the dial cover plate. In addition there may be one or several transparent discs 78 embedded in a rubber or like ring 79. A protective lid 80 is hinged to the cover part.

In the modification illustrated in Figs. 14 and 15 the base part 65a has a screw 73a in place of the flange 73. The cover part 64a has a screwed flange 72a in place of the flange 72 and it can have a magnifying transparent cover such as 80a.

The constructions described above provide a dry type meter. When a wet type meter is required, that is where water surrounds the register case for the purpose of preventing interference with the gearing, a cavity is provided between the register case 36 and the cover part 64 or 64a and a passage is formed to the annular cavity 69 so that the register case with the exception of the dial face is surrounded by water.

In operation water flows through the inlet 67 to the meter casing and through the inlet port 21 in the measuring chamber. In its passage through the measuring chamber to the outlet port 23 the water causes the piston to oscillate about the radial division plate 22, said movement being effected by the water flowing from the inside to the outside of the piston through the transfer ports 24 and 26. Finally the water flows through the outlet port 23 to the cavity 69 around the wall of the measuring chamber and through the outlet 70 of the meter casing.

We claim:

1. A water meter having a magnetic coupling for the piston and registering mechanism comprising a casing housing a measuring chamber and a register case, a piston in said measuring chamber having a drive pin projecting from the top thereof, said register case having a cylindrical hollow boss projecting upwardly axially from the bottom accommodating said piston drive pin, a journal pin anchored in the top of said hollow boss and projecting downwardly therein having a hub rotatably mounted thereon with a permanent magnet incorporated in the hub and means in said hub to engage said piston drive pin; a bearing in the top of said hollow boss with a spindle thereon projecting upwardly, an inverted U shaped magnet armature fixed to said spindle made of plate with the top shaped as an aerofoil and legs shaped to rotate about said hollow boss, a worm on said spindle and a train of gears connecting said worm with a registering unit mounted in said register case.

2. A water meter as claimed in claim 1 wherein said permanent magnet is made as units embedded in the wall of the hub.

ALAN BRAY LINDLEY.
ALFRED VICTOR HEMMENS.

REFERENCES CITED

The following references are of record in the file of this patent:

UNITED STATES PATENTS

| Number | Name | Date |
| --- | --- | --- |
| 1,608,231 | Bradley | Nov. 23, 1926 |
| 1,834,025 | Granger | Dec. 1, 1931 |
| 1,856,850 | Marden | May 3, 1932 |
| 2,399,856 | Coger | May 7, 1946 |
| 2,487,783 | Bergman | Nov. 15, 1949 |

FOREIGN PATENTS

| Number | Country | Date |
| --- | --- | --- |
| 11,745 | Great Britain | 1897 |